United States Patent
Rabe et al.

(10) Patent No.: US 7,100,032 B2
(45) Date of Patent: Aug. 29, 2006

(54) METHOD AND APPARATUS FOR IDENTIFYING HARDWARE COMPATIBILITY AND ENABLING STABLE SOFTWARE IMAGES

(75) Inventors: Jeffrey L. Rabe, Folsom, CA (US); Alberto J. Martinez, El Dorado Hills, CA (US); Serafin E. Garcia, Folsom, CA (US); Jackie Wensel, Folsom, CA (US)

(73) Assignee: Intel Corporation, Santa Clara, CA (US)

( * ) Notice: Subject to any disclaimer, the term of this patent is extended or adjusted under 35 U.S.C. 154(b) by 718 days.

(21) Appl. No.: 10/187,222

(22) Filed: Jun. 28, 2002

(65) Prior Publication Data

US 2004/0003224 A1 Jan. 1, 2004

(51) Int. Cl.
*G06F 9/00* (2006.01)
(52) U.S. Cl. ................ 713/1; 710/8; 719/327
(58) Field of Classification Search ............ 710/8, 710/260; 713/1, 200; 717/170; 709/220–222, 709/229; 719/310, 327

See application file for complete search history.

(56) References Cited

U.S. PATENT DOCUMENTS 5,454,078 A * 9/1995 Heimsoth et al. ......... 709/222
5,577,232 A   11/1996 Priem et al.
5,802,365 A    9/1998 Kathail et al.
5,809,329 A    9/1998 Lichtman et al.
5,812,858 A *  9/1998 Nookala et al. ........... 710/260
6,330,608 B1* 12/2001 Stiles ........................ 709/229
6,457,069 B1*  9/2002 Stanley ....................... 710/8

FOREIGN PATENT DOCUMENTS

WO    WO 99/66413    12/1999

OTHER PUBLICATIONS

Gattis "hardware and software compatibility issues" 1990 IEEE, pp. 650-656.□□*
Lin et al. "Configuration management with logical structures" 1996 IEEE, pp. 298-307.□□*
Zeller "A unified version model for configuration management" 1995 ACM, pp. 151-160.□□*
Zeller et al. "Unified versioning through feature logic" 1997 ACM, pp. 398-441.*
PCT International Search Report, International Application No. PCT/US03/19543, dated Oct. 28, 2004, 3 pages.

* cited by examiner

*Primary Examiner*—William Thomson
*Assistant Examiner*—George Opie
(74) *Attorney, Agent, or Firm*—Derek J. Reynolds

(57) ABSTRACT

An approach to selecting either an actual stepping revision ID value or a compatible revision ID value to be readable by a processor through a revision ID register.

15 Claims, 5 Drawing Sheets

METHOD AND APPARATUS FOR IDENTIFYING HARDWARE COMPATIBILITY AND ENABLING STABLE SOFTWARE IMAGES

FIELD OF THE INVENTION

A method and an apparatus for identifying compatibility between revisions of hardware and software, and for simplifying the use of different combinations of different revisions of hardware and software is disclosed.

ART BACKGROUND

In an effort to improve the ease of use of complex electronic devices, including computers, increasing use has been made in recent years of software readable registers that supply information identifying specific hardware components. This identifying information tends to include hardware revision information such as manufacturing revision and design level, usually identified with binary values of some form, including numbers serving as identification codes.

Also in an effort to improve ease of use, operating systems and other software that control the operation of such complex electronic devices, in recent years, have made increasing use of reading registers that provide such hardware revision information (e.g., binary values) to ensure that revisions of software needed to support the revisions of hardware that are present have been installed. This is often done to check that necessary revisions of device drivers needed by an operating system to communicate with and properly utilize the features of a specific hardware device are present. If such operating systems discover that a revision of software, such as a device driver, is needed, but not present so that it may be used, then such operating systems are often designed to present the user with a message asking for the necessary software.

Such measures to improve ease of use have had beneficial effects. Without such measures, users (or technicians providing support to users) have had to take steps, themselves, to ensure that the software needed to support specific hardware components in any given electronic device is provided. This often requires the user or technician to be knowledgeable about the hardware components and accompanying software to a considerable level of detail. However, such measures to improve ease of use have resulted in many users being freed from needing to have knowledge to such a level of detail, and in many cases, have also freed many users from needing to rely so heavily on support being provided by others.

However, such measures to improve ease of use have also added a new complexity to the use of such hardware components and software that did not previously exist. Over time, as hardware ages or is used, various hardware components tend to wear out and require replacement. It is often possible for an old hardware component to be replaced by a new hardware component that is substantially similar in many ways in design and functionality such that the replacement of an old hardware component by a new hardware component should not require a user or a technician to provide any software that was not already present. However, manufacturers don't usually continue to manufacture the very same hardware components, over time, without making modifications. Manufacturers of hardware tend to make improvements or changes to the design of hardware over time, even if such changes do nothing more than reduce manufacturing costs, reduce power consumption, reduce physical size, or any of a number of other possible changes that should not require the installation of new software to make use of the new hardware. Unfortunately, as manufacturers make such improvements, it is often desirable to reflect the fact that such improvements have been made by altering one or more values contained within the registers read by software to reflect the fact that the hardware represents a new hardware revision.

While it is desirable for software readable registers to reflect the fact that a specific hardware component represents a hardware revision that is newer than a hardware component that is being replaced, this often results in the software reading such registers, encountering the indication of a change in revision, and then asking a user or technician to install a newer revision of software to support the new revision of hardware, regardless of whether or not new software is actually needed for the new hardware component to work correctly. In other words, after a new hardware component has been installed by a user to replace an older hardware component that has been found to be malfunctioning, the user is then confronted with a message provided by the operating system indicating that new software must be installed, even if the new hardware component is identical in function to the hardware component that it replaces.

This has proven to be inconvenient for users, and in the case of corporations or other large organizations with personnel dedicated to supporting many users within that organization, this has also proven to be quite costly in terms of time and/or other resources being expended to satisfy the needs of users confronted with requests for the provision of unnecessary software.

BRIEF DESCRIPTION OF THE DRAWINGS

The objects, features, and advantages of the invention as hereinafter claimed will be apparent to one skilled in the art in view of the following detailed description in which:

DETAILED DESCRIPTION

Although numerous details are set forth for purposes of explanation and to provide a thorough understanding in the following description, it will be apparent to those skilled in the art that these specific details are not required in order to practice the invention as hereinafter claimed.

A method and an apparatus for identifying compatibility between revisions of hardware and software, and for simplifying the use of different combinations of different revisions of hardware and software are disclosed. Specifically, an embodiment concerns choosing from among multiple registers a value to be used in identifying the revision of a hardware component to further the ease of use of that hardware component with a particular piece of software. However, although embodiments are discussed in reference to values stored and read from registers, the invention as hereinafter claimed also encompasses other approaches to storing and reading values or other forms of identification used to specify the revision of a hardware component.

Figure 1A:
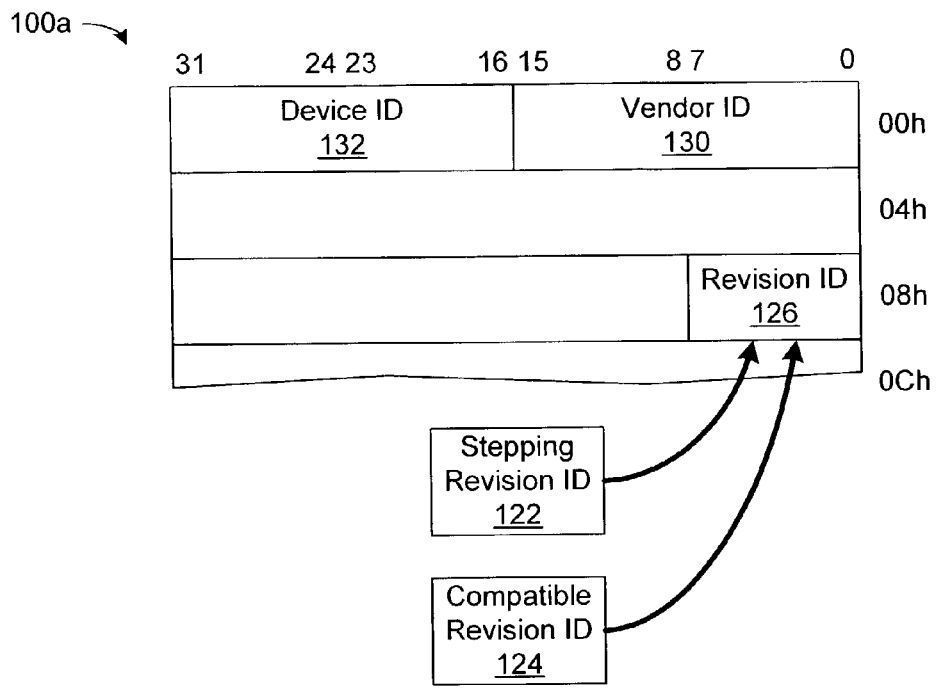
FIGS. 1a and 1b are an address map and schematic of registers of an embodiment providing hardware revision information.
Figure 1B:
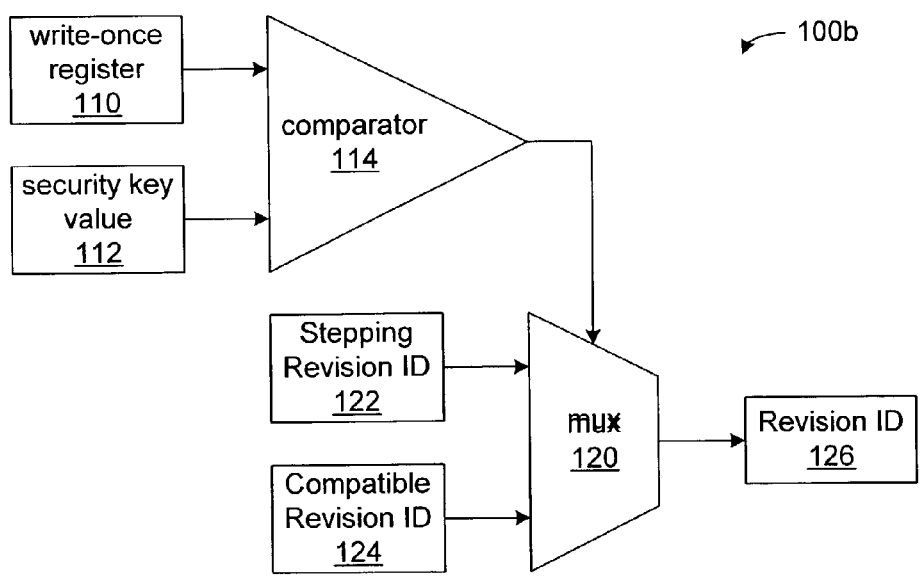

FIGS. 1a and 1b depict an address map and schematic, respectively, of an embodiment of registers providing hardware revision information. Address map 100a shows the address locations of a small number of registers intended to be used by software to identify a hardware component of which logic 100b is a part. Specifically, as those skilled in the art will recognize, address map 100a shows an organization of address locations for a hardware component that conforms to the specifications of the widely known and widely used peripheral component interconnect or "PCI" bus. Vendor ID register 130 at address 00h is intended to be read by software to provide a 16-bit binary value identifying the manufacturer of a hardware component. Device ID register 132 at address 02h is intended to provide a 16-bit binary value identifying what the hardware component is. Revision ID register 126 provides an 8-bit binary value identifying the revision level of the hardware component. Of course these specific bit sizes are presented only as examples to facilitate discussion, and are not intended to be limiting.

Logic 100b is used to select the value for the revision ID that will be read by software from revision ID register 126 to identify the revision level of the hardware component of which logic 100b is a part. A value identifying the actual revision level of the hardware component of which logic 100b is a part is maintained by stepping revision ID register 122. A value identifying a revision level of hardware with which the hardware component is compatible enough to run similar software is maintained by compatible revision ID register 124. Both stepping revision ID register 122 and compatible revision ID register 124 are coupled to the inputs of multiplexer 120, the output of which is coupled to revision ID register 126. Write-once register 110 and security key value register 112 are both coupled to the inputs of comparator 114, the output of which is coupled to the selection input of multiplexer 120.

In this embodiment, a value is written in any of a number of possible ways into write-once register 110, and that value is then compared by comparator 114 against the security key value maintained by security key value register 112. If the two values match, then the output of comparator 114 changes so as to signal multiplexer 120 to change from providing the value maintained by stepping revision ID register as the value that software will later be able to read from revision ID register 126 (which is the default in this embodiment) to providing the value maintained by compatible revision ID register, instead. As the name of write-once register 110 suggests, write-once register 110 is designed to be written to only once during normal operation of the hardware component of which logic 100b is a part. This limitation is part of a form of security that provides for only one opportunity to change the value that software will later be able to read from revision ID register 126. If the value written to write-once register 110 does not match the value maintained by security key value register 112, then the opportunity to change the value that software will later be able to read from revision ID register 126 is lost.

Depending on the design of the hardware component of which logic 100b is a part, multiplexer 120 may be reset to provide the value maintained in stepping revision ID register 122 to software reading revision ID register 126 whenever the hardware component is reset to initialize the hardware component for normal use. It may also be that resetting the hardware component for normal use renews the one opportunity afforded by write-once register 110 to change the value that software will be able to read from revision ID register 126. Furthermore, although there can be any of a number of approaches to writing a value to write-once register 110, in one variation of this embodiment, the value is written to write-once register 110 when software actually writes a value to revision ID register 126.

As those skilled in the art will readily understand, a wide variety of possible approaches may be used to implement security key value register 112, stepping revision ID register 122 and compatible revision ID register 124, and to provide these registers with the values that each maintain. Such approaches include, but are not limited to hard wiring, the use of read-only memory devices, preprogramming by other software at a time before the normal use of the hardware component of which logic 100b is a part, or selectively tying pins of an integrated circuit to high or low voltages via resistors mounted on a circuit board, among other approaches. Specifically, compatible revision ID register 124 may implemented as a register writable by software or a non-volatile reprogrammable storage device that may be reprogrammed by a user (or technician) through a software utility.

Furthermore, as those skilled in the art will understand, the use of a security key value and accompanying security key value register 112 is but one of many possible approaches that could be used to restrict access needed to select the value that would be supplied to software reading revision ID register 126. Specifically, it may be that there is one piece of software that is permitted to make the selection and does so, while another piece of software can only read the selection that was made. The manner in which the one piece of software is permitted to have the access needed to make a selection while another piece of software is not may be a hardware design that prevents another piece of software from ever having access, OS-assigned permissions whereby the one piece of software runs at a more privileged level than another piece, or still other ways. It may also that the one piece of software runs on a separate processor from another piece of software. Specifically, the one piece of software may run on a separate microcontroller used to configure the hardware components of what may be a computer system as part of readying the hardware components for normal use by other software.

Also, as those skilled in the art will understand, the latching of the selection of value to be readable by a processor from revision ID 126 may be carried out in any of a number of ways. Specifically, the above discussion has centered on the use of write-once register to both latch a value and provide that value for comparison to the security key maintained by security key value 112. This latching of the value written to write-once register 110 implies that the value supplied to comparator 114 by write-once register 110 is kept constant after being latched, causing the output of comparator 114 to multiplexer 120 to be kept constant, and thereby effectively "latching" the choice of value to be readable from revision ID register 126. However, it is also possible that the output of comparator 114 may pass through a latch (not shown) before reaching multiplexer 120, so that the output of comparator 114, itself, may be latched. This may be deemed a desirable alternative to write-once register 110 latching a multi-bit value written to it in order to reduce overall circuit complexity.

Although the embodiment depicted in FIGS. 1a and 1b specifically conforms to requirements of the PCI bus, it will be readily apparent to those skilled in the art that the invention as hereinafter claimed is not so limited and that embodiments intended for use with other bus standards or with entirely different forms of hardware are possible.

Figure 2:
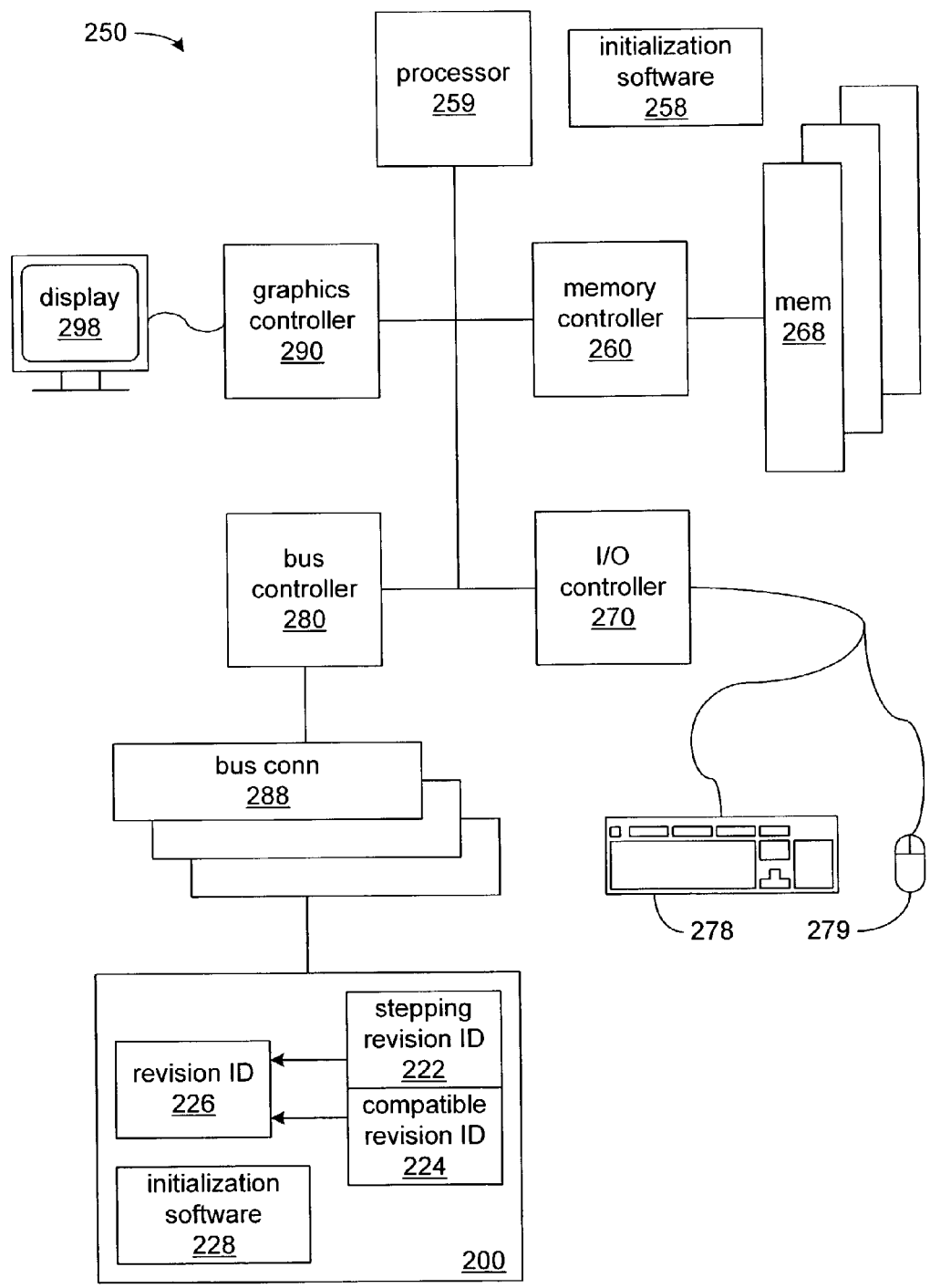
FIG. 2 is a block diagram of an embodiment of a hardware component interacting with a computer system.

FIG. 2 depicts a block diagram of an embodiment showing interaction between a computer system and one of its hardware components. Hardware component 200 is a component of computer system 250, and may be coupled to the rest of computer system 250 through one of bus connectors 288, perhaps by a user of computer system 250, or by a technician supporting such a user. Hardware component 200 includes revision ID register 226, which may take on the value supplied either by stepping revision ID register 222 or compatible revision ID register 224. Hardware component 200 may also include a solid state device storing initialization software 228.

Beyond hardware component 200, computer system 250 also includes processor 259 which, depending on the design or intended purpose of computer system 250, may be coupled to one or more of memory controller 260, I/O controller 270, bus controller 280 and graphics controller 290. Memory controller 260 is further coupled to memory 268, I/O controller 270 is further coupled to one or more I/O devices that could include keyboard 278 and/or mouse 279, bus controller 280 is further coupled to bus connectors 288, and graphics controller 290 is further coupled to display 298. Furthermore, computer system 250 may also include initialization software 258.

Initialization software 228 and/or 258 may be stored in a form of solid state device such as a ROM (read-only memory) device, an EPROM (erasable programmable read-only memory) device, or other rewritable memory device such as flash memory device or a non-volatile memory device such as a RAM (random access memory) device with battery backup. Alternatively, initialization software 228 and/or 258 may be stored in any of a variety of available disk, tape or other forms of machine-accessible medium.

At a given time, such as when computer system 250 is powered up, when computer system 250 is reset, and/or when the configuration of hardware components of computer system 250 is changed (possibly by the addition or removal of a hardware component such as hardware component 200), initialization software 258 is executed to check that computer system 250 is ready for normal use and/or to prepare computer system 250 for normal use. Initialization software 258 may cause processor 259 to query for the presence or status of one or more hardware components, and/or cause processor 259 to perform one or more tests.

In one variation of the embodiment, software 258 causes processor 259 (or possibly some other processor within computer system 250) to detect the presence of hardware component 200, and may well have been written to interact with hardware component 200. If indeed, initialization software was written to interact specifically with hardware component 200, initialization software 258 may be written to make a selection between either stepping revision ID register 222 or compatible revision ID register 224 to supply the value which will be subsequently readable from revision ID register 226. Initialization software 258 then causes processor 259 (or another processor) to access the logic controlling the selection of this value within hardware component 200, using a approach similar to what was described at length for logic 100b of FIG. 1b, or using any of a variety of other possible approaches.

In one variation of the embodiment, initialization software 228 included with hardware component 200 was written to interact with hardware component 200, and may have been written to make a selection between either stepping revision ID register 222 or compatible revision ID resister 224 to supply the value which will subsequently be readable from revision ID register 226. If so, then initialization software 228 causes processor 259 (or another processor) to access the logic controlling the selection of this value within hardware component 200, either using an approach similar to what was described at length for logic 100b of FIG. 1b, or using any of a variety of other possible approaches.

Whether it is initialization software 228 or 258 that causes a selection of the value to be subsequently read from revision ID register 226 to be made, the actual choice of value may be dependent on any of a variety of possible factors. In one embodiment, it may be known to those creating initialization software 228 or initialization software 258 that problems involving a particular operating system or other software arise quite frequently when one or the other of the values from stepping revision ID register 222 or compatible revision ID register 224 is selected. As a result, those creating initialization software 228 or 258 may arrange for initialization software 228 or 258 to either limit the selection of values in some manner, or entirely prevent the selection of a value known to cause such problems. This might be done by either "hard coding" a preferred selection into initialization software 228 or 258, or at least making a preferred selection the default.

In another embodiment, it may be that a user of computer system 250 (or a technician supporting such a user) is provided by the creators of initialization software 228 or 258 with a way to choose a value depending on what particular operating system or other software will normally be used with computer system 250. In such an embodiment, initialization software 228 or 258 may cause processor 259 (or some other processor) to provide some form of on-screen menu viewable through graphics controller 290 and display 298 by which a user or technician may make such a selection. This may be desirable where there are a number of possible operating system or other pieces of software that a user or technician may choose to install on computer 250. Some operating systems and other pieces of software may become unstable or malfunction, or may make an undesired request for a newer revision of driver software if a particular one of the available values is chosen, and yet, such problems could be prevented with the choice of another value. It may also be that a user or technician has replaced an older hardware component with hardware component 200, that hardware component 200 is designed so that it could be used in the same way as the older hardware component, and that hardware component 200 could be used without replacing software used with the older hardware component so long as a value is chosen that causes hardware component 200 to either present the same value to such software as was presented by the older hardware component, or at least a value that has the effect of avoiding having a user or technician being presented with a request for a different revision of software or other undesirable result.

In still another embodiment, where a choice by a user or technician is allowed for, it may be that a user or technician has replaced an older hardware component with hardware component 200, and hardware component 200 provides different or more extensive capabilities than the older hardware component that was replaced. Yet, the user or technician may not want to make use of these different or more extensive capabilities, and may simply wish to use hardware component 200 in the same way in which the older hardware component was used, and therefore, it may be desirable to choose a value that causes hardware component 200 to either present the same value to such software as was presented by the older hardware component, or at least a value that avoids having a user or technician being presented with a request for a different revision of software or other undesirable result.

It may be desirable to provide a user or technician with a choice of values to be presented by revision ID register 226 when it is queried by operating system or other software where, for example, hardware component 200 is a 1 Gbit/sec network card that is being installed in place of an older 100 Mbit/sec network card, or where hardware component 200 is a surround-sound capable audio card that is being installed in place of an older stereo-only audio card. It may be that the manufacturer of the older network or audio card that has been replaced simply does not make that type of older card, anymore, and the newer variants of such cards are the only kind that are available, and yet, the user of computer system 250 (or that user's technician) may simply want to install the newer hardware component 200 in place of the older variant, and simply have the computer continue to operate exactly as it did, before. Therefore, choosing a value for revision ID register 226 that matches or is in some way equivalent to the value that was presented by the older variant would avoid having the operating system or other software being given an indication that newer hardware with possibly newer capabilities is now present.

Another specific situation in which it may be desirable to provide a user or a technician with a choice of values may be when the manufacturer of hardware component 200 actually manufactures the same type of hardware in multiple places, but because of differences in manufacturing processes at different places or other relatively minor details having nothing to do with function, the values provided by stepping revision ID register 222 are different. It may be desirable to have a choice of values so that all of the variants of hardware component 200 are able present the same value, regardless of where they were manufactured.

Furthermore, in any of these embodiments, or in still other embodiments, it may be that there are more than simply two values to be chosen. Specifically, there may be more than one compatible revision ID register 224, each of which supplies a different value that may be desirable for use of various different operating systems or pieces of software.

Figure 3A:
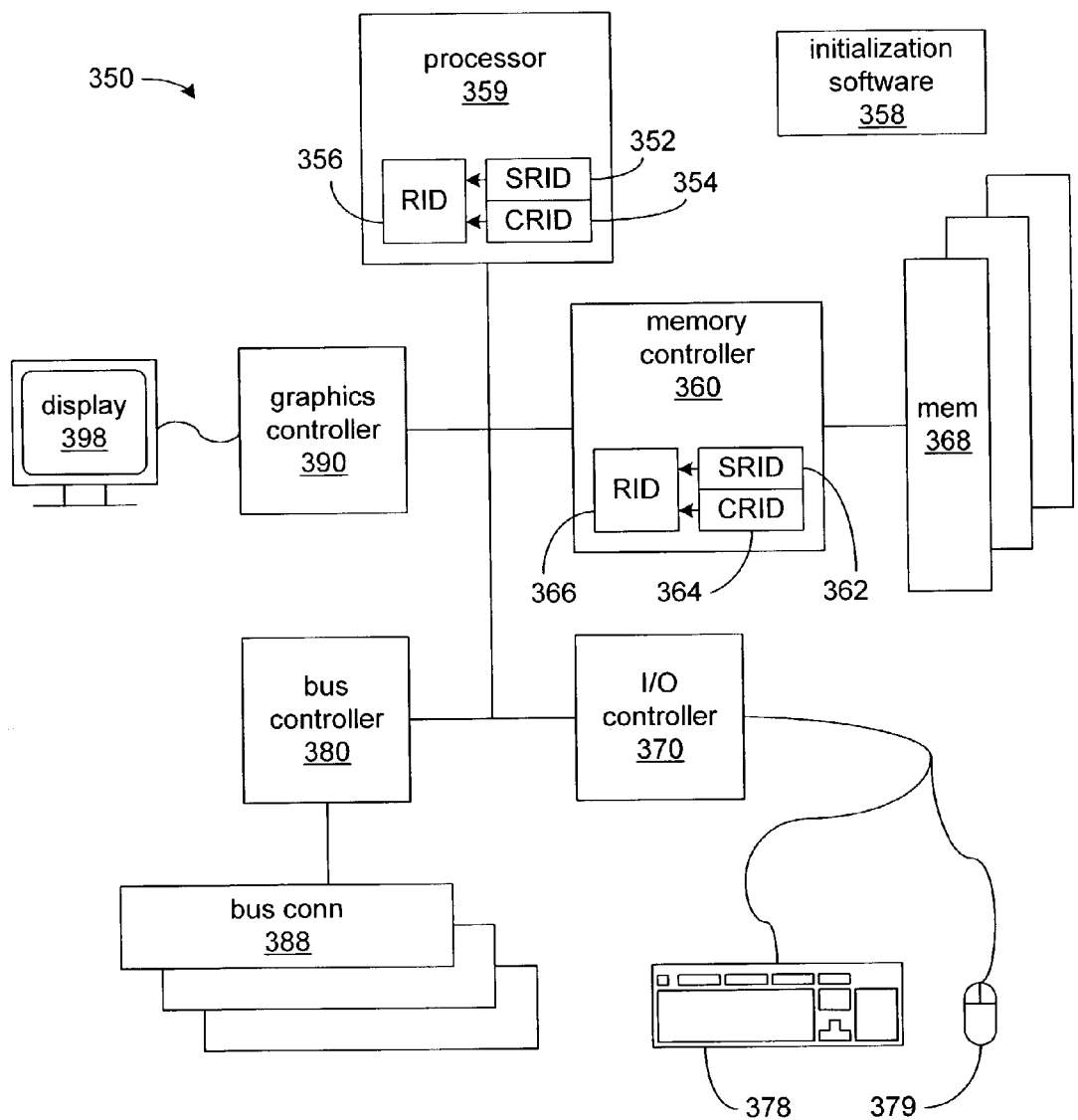
FIGS. 3a and 3b are block diagrams of embodiments of a computer system.

FIG. 3a depicts a block diagram of an embodiment of a computer system. In a manner generally corresponding to computer system 250 of FIG. 2, computer system 350 includes processor 359 which, depending on the design or intended purpose of computer system 350, may be coupled to one or more of memory controller 360, I/O controller 370, bus controller 380 and graphics controller 390. Memory controller 360 is further coupled to memory 368, I/O controller 370 is further coupled to one or more I/O devices that could include keyboard 378 and/or mouse 379, bus controller 380 is further coupled to bus connectors 388, and graphics controller 390 is further coupled to display 398. However, unlike computer system 250, one or both of processor 359 and memory controller of computer system 350 may have revision ID registers with selectable values. Specifically, as depicted in FIG. 3, processor 359 could have revision ID register 356 along with stepping revision ID register 352 and compatible ID register 354, and similarly, memory controller 360 could have revision ID register 366 along with stepping revision ID register 362 and compatible ID register 364. Computer system 350 may also include initialization software 358.

As was the case with computer system 250 of FIG. 2, in computer system 350, initialization software 358 may be stored in a solid state device such as a ROM (read-only memory) device, an EPROM (erasable programmable read-only memory) device, or other rewritable memory device such as flash memory device or a non-volatile memory device such as a RAM (random access memory) device with battery backup. Alternatively, initialization software 358 may be stored in any of a wide variety of available disk, tape or other storage media-based devices.

At a given time, such as when computer system 350 is powered up, when computer system 350 is reset, and/or when the configuration of hardware components of computer system 350 is changed (possibly by the addition or removal of a hardware component), initialization software 358 is executed to check that computer system 350 is ready for normal use and/or to prepare computer system 350 for normal use. Initialization software 358 may cause processor 359 to query for the presence or status of one or more hardware components, and/or cause processor 359 to perform one or more tests.

Initialization software 358 may cause processor 359 (or possibly some other processor within computer system 350) to detect the presence of particular revisions of processor 359 and/or memory controller 360. Initialization software 358 may be have been written to make a selection between either stepping revision ID register 352 or compatible revision ID register 354 of processor 359 to supply the value which will be subsequently readable from revision ID register 356, or a selection between either stepping revision ID register 362 or compatible revision ID register 364 of memory controller 360 to supply the value which will be subsequently readable from revision ID register 366. Initialization software 358 will then cause processor 359 (or another processor) to access the logic controlling the selection of these values and make selections as appropriate.

As was the case in computer system 250 of FIG. 2, the actual choice of value to be subsequently readable from one or the other of revision ID registers 356 and/or 366 may be made to be dependent on any of a variety of possible factors. These factors could be knowledge on the part of the creators of initialization software 358 of potential problems or malfunctions if specific values are chosen or not chosen, or it could be a choice that is left up to a user or a technician support a user to make. As previously discussed with regard to initialization software 228 and 258 of FIG. 2, initialization software 358 may present a user or technician with a choice of values, and this choice of values may be provided by way of menus displayed through graphics controller 390 and/or display 398, or by any of a variety of other possible ways.

Malfunctions in components or even a simple desire to upgrade computer system 350 with a processor 359 that is faster than a processor that was previously installed may present a situation in which a new hardware component is introduced that has a stepping revision ID register with a value that is different from that of an older hardware component being replaced, and yet, it may be desirable for the operating system or other particular software to not be made aware of the change in hardware components. It may be that a faster processor 359 is installed that also provides additions to its instruction set or other functionality that, for whatever reason, a user or technician does not desire to make use of, and therefore, a user or technician may choose to select a value to be subsequently readable from revision ID register 356 that mimics the value presented by an older processor. Malfunctions in components may require that a new memory controller 360 be installed in place of and older one, but because the manufacturer of memory controller 360 may have shrunk the die size or made some other change that in no one way affects the function of how memory controller 360 in comparison to the one that it replaces, memory controller 360 may present the operating system or other software with a revision ID value in revision ID register 366 that causes the operating system or other software to become unstable or inoperable, or to request a software update or another revision of software unless a different value is chosen.

A specific situation in which providing a choice of values to be made subsequently readable from either or both of revision ID 356 or 366 may be where computer system 350 is one of a great many computers in use in something like a corporate setting. The computers used in such a place, including computer system 350, may all have been intended to be of identical configurations all purchased from the same source, but due to minor improvements made by manufacturers of one or more of the components used in these computers over time, the revision ID value of one or more of the components of these computers may not all be the same, at least if the values supplied by the stepping revision ID registers are used in all cases. This may cause difficulty with a desire to use a common set of software made up of particular revisions of each piece of software throughout such a place. Being able to select a value from a compatible revision ID register in one or more components in at least some of such computers may be needed to make it possible to use such a common set of software.

Figure 3B:
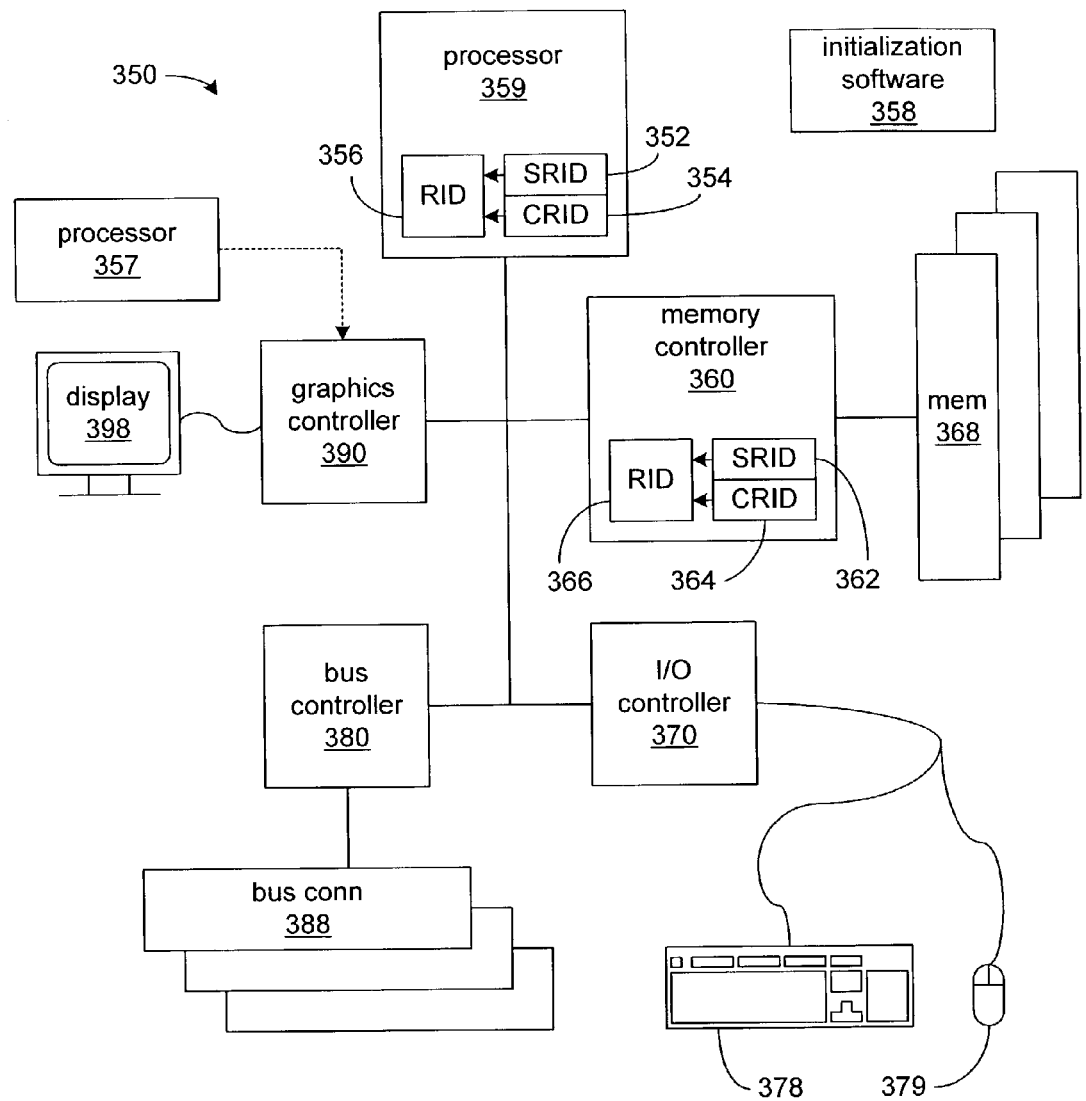

FIG. 3b depicts a block diagram of another embodiment in the form of a computer system. Specifically, computer system 350 of FIG. 3b, is substantially identical to computer system 350 of FIG. 3a, except for the addition of a second processor, namely processor 357. Processor 357 is used to aid in configuring and/or monitoring the functionality of computer system 350. Processor 357 may be implemented as a microcontroller incorporating a quantity of memory, including its own initialization code, within a single integrated circuit. It is likely that processor 357 may possess one or more communications ports to be used in relaying the operational status of computer system 350 to other devices external to computer system 350, including possibly a centralized monitoring computer system.

In this embodiment, processor 357 may be caused by its own initialization code to detect the presence of particular revisions of processor 359 and/or memory controller 360. Processor 357 may then make a selection between either stepping revision ID register 352 or compatible revision ID register 354 of processor 359 to supply the value which will be subsequently readable from revision ID register 356, and/or make a selection between either stepping revision ID register 362 or compatible revision ID register 364 of memory controller 360 to supply the value which will be subsequently readable from revision ID register 366. Processor 357 would then cause the selected values to be readable by software later executed by processor 359 via revision ID registers 356 and/or 366.

In such an embodiment where another processor, such as processor 357, has access to the logic needed to select values for revision ID registers 356 and/or 366, it is likely that the logic would be designed or otherwise configured so as not to be accessible by processor 359. Furthermore, processor 357 may have access to graphics controller 390, either directly or indirectly through logic that would otherwise be used by processor 359, to provide the opportunity for a user of computer system 350 or a technician supporting such a user to select the values to be made readable via revision ID registers 356 and/or 366 by way of an onscreen menu or other approach.

Although processor 359 and memory controller 360 are depicted in FIGS. 3a and 3b as having revision ID, stepping revision ID and compatible revision ID registers, it will be readily understood by those skilled in the art that these are alternatives presented as examples for purposes of discussion. Specifically, it will be readily understood by those skilled in the art that other components of computer system 350 may be provided with such additional features in addition to or in lieu of such features existing within processor 359 and/or memory controller 360.

Figure 4:
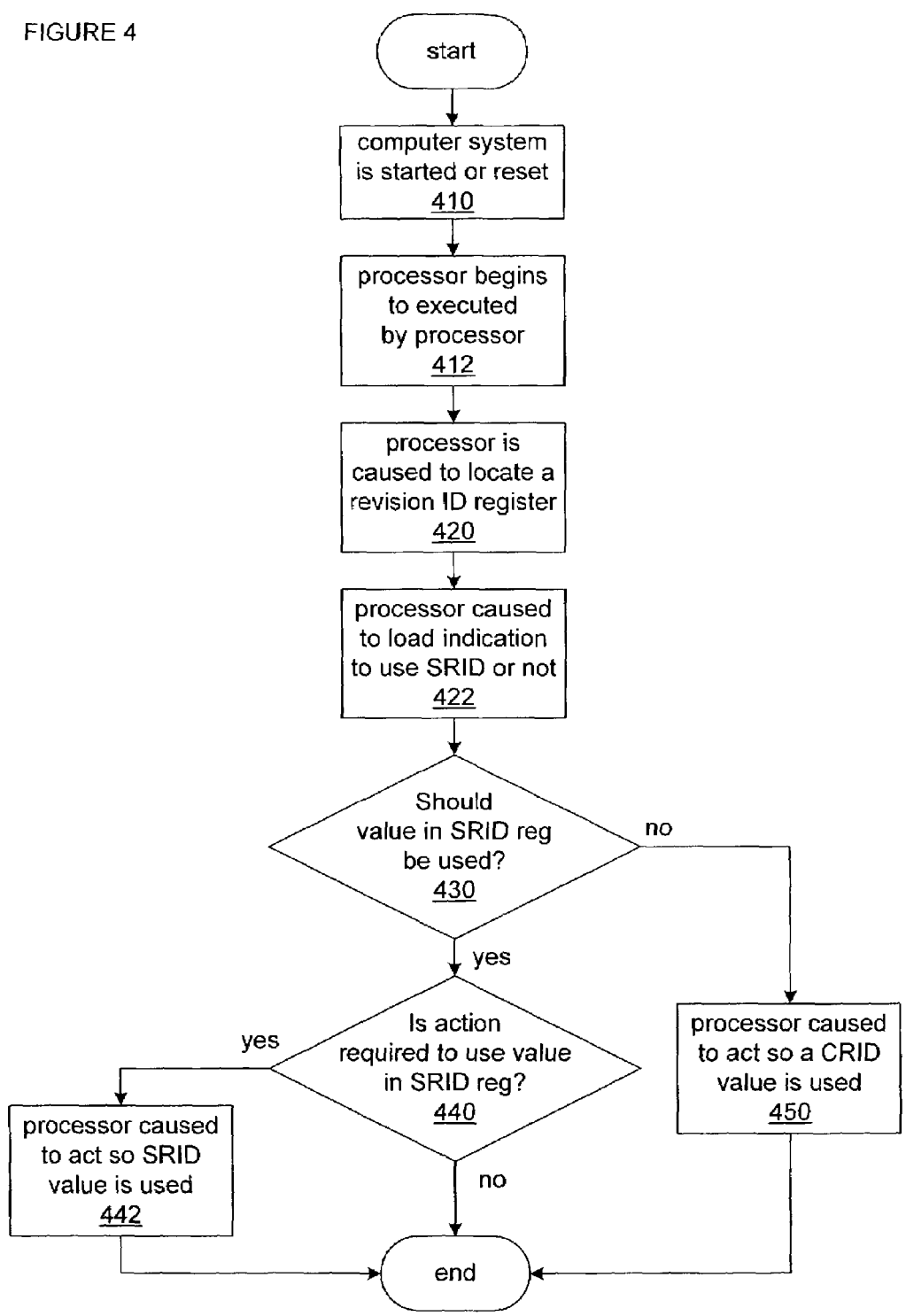
FIG. 4 is a flow chart of an embodiment of an approach to select a value identifying a hardware revision.

FIG. 4 depicts flow chart of an embodiment of an approach to initialization taken by a piece of initialization software. At 410, a computer system is either powered on or reset, and at 412, a piece of initialization software begins to be executed by a processor. At 420, the initialization software causes the processor to locate a revision ID register, and at 422, causes the processor to load an indication (either hard-coded within the initialization software, itself, or from some other source) of a choice that has been made as to whether or not the value maintained in the stepping revision ID register should be use. If, at 430, the value in the stepping revision ID register is to be used, and if, at 440, no action is required to cause the value in the stepping revision ID register to be used, then the initialization software does not cause the processor to take any further action regarding values for a revision ID. However, if at 440, action is required to cause the value in the stepping revision ID register to be used, then the initialization software takes that additional action at 442. If, at 430, the value maintained in the stepping revision ID register should not be used, then a value from a compatible revision ID register is to be used, and at 450, action is taken to cause the value in that compatible revision ID register to be used.

In one embodiment, it may be that at either 442 or 450, a security key value must be written to a register to enable the desired value to be chosen, perhaps in a way similar to what was described with regard to FIG. 1. Alternatively, other approaches to security may be used to ensure that only the initialization software is able to effect a selection of value that will be readable from the revision ID register.

The invention has been described in conjunction with the preferred embodiment. It is evident that numerous alternatives, modifications, variations and uses will be apparent to those skilled in the art in light of the foregoing description. It will be understood by those skilled in the art that the invention as hereinafter claimed may be practiced in support of identifying revisions of various components of digital electronic systems including, but not limited to computer systems. Although embodiments have been depicted involving the use of registers and with a stepping revision ID value being used as a default, it will be recognized by those skilled in the art that other forms of hardware may be used to hold, store and/or provide values or other forms of revision level identification, and that other variations of revision ID values may be made the default that will be used unless some contrary action is taken by a user, a technician supporting a user, and/or some form of software. Also, although embodiments have been depicted centering on the choice of a value to describe a revision level of a hardware component, the approaches discussed with regard to those embodiments may also be applied to other aspects of the identification of hardware components, including, but not limited to device ID values and/or device ID registers.

What is claimed is:

1. An apparatus comprising:
a revision identification (ID) register readable by a processor;

a stepping revision ID register to maintain a value indicating the actual stepping revision level of a first hardware component;

one or more compatible revision ID registers to maintain a value indicating a stepping revision level of a second hardware component that may be used with a same piece of software as the first hardware component, wherein one of the at least one compatible revision ID registers comprises at least one pin of a package enclosing the integrated circuit being tied to at least one voltage level to provide the stepping revision level of the second hardware component; and selection logic to enable the selection of a value from either the stepping revision ID register or one of the one or more compatible revision ID registers, the selected value to be readable by the processor, wherein the selection logic comprises a multiplexer within an integrated circuit and the stepping revision ID register comprises at least one hardwired connection within the integrated circuit that ties at least one input of the multiplexer to at least one voltage level to provide the value indicating the actual stepping revision level of the first hardware component.

2. The apparatus of claim 1, further comprised of a storage device to store instructions comprising an initialization software, wherein the selection logic is responsive to the processor executing the instructions.

3. The apparatus of claim 1, wherein the address at which the revision ID register is readable by the processor conforms with the address location for the revision ID register specified for use with a peripheral component interconnect (PCI) bus.

4. The apparatus of claim 1, wherein the actual stepping revision level maintained in the stepping revision ID register indicates that the first hardware component provides at least one additional function beyond the functions provided by the second hardware component, and the at least one additional function is not needed for a piece of software used with the second hardware component to be used with the first hardware component.

5. The apparatus of claim 1, wherein the selection logic comprises a security key value register to maintain a security key value, and a write-once register into which the processor must be caused to write a value that matches the security key value by an initialization software to enable control of the selection logic by the first processor.

6. A computer system comprising:
a processor;
memory coupled to the processor;
a graphics controller coupled to the processor;
a storage device to store instructions comprising an initialization software;
a revision identification (ID) register readable by the processor;
a stepping revision ID register to maintain a value indicating the actual stepping revision level of a first hardware component;
one or more compatible revision ID registers to maintain a value indicating a stepping revision level of a second hardware component that may be used with a same piece of software as the first hardware component, wherein one of the at least one compatible revision ID registers comprises at least one pin of a package enclosing the integrated circuit being tied to at least one voltage level to provide the stepping revision level of the second hardware component; and
selection logic to enable the selection of a value from either the stepping revision ID register or one of the one or more compatible revision ID registers, the selected value to be readable by the processor, wherein the selection logic comprises a multiplexer within an integrated circuit and the stepping revision ID register comprises at least one hardwired connection within the integrated circuit that ties at least one input of the multiplexer to at least one voltage level to provide the value indicating the actual stepping revision level of the first hardware component.

7. The computer system of claim 6, wherein the selection logic is responsive to the processor executing the instructions of the initialization software.

8. The computer system of claim 6, wherein the address at which the revision ID register is readable by the processor conforms with the address location for the revision ID register specified for use with a peripheral component interconnect (PCI) bus.

9. The computer system of claim 6, wherein the actual stepping revision level maintained in the stepping revision ID register indicates that the first hardware component provides at least one additional function beyond the functions provided by the second hardware component, and the at least one additional function is not needed for a piece of software used with the second hardware component to be used with the first hardware component.

10. The computer system of claim 6, wherein the selection logic comprises a security key value register to maintain a security key value, and a write-once register into which the processor must be caused to write a value that matches the security key value by the initialization software to enable control of the selection logic by the processor.

11. The computer system of claim 6, wherein the first hardware component is incorporated within the processor.

12. A computer system comprising:
a first processor;
a second processor;
a graphics controller coupled to the first and second processors;
a storage device to store instructions comprising an initialization software;
a revision identification (ID) register readable by the first processor;
a stepping revision ID register to maintain a value indicating the actual stepping revision level of a first hardware component;
one or more compatible revision ID registers to maintain a value indicating a stepping revision level of a second hardware component that may be used with a same piece of software as the first hardware component, wherein one of the at least one compatible revision ID registers comprises at least one pin of a package enclosing the integrated circuit being tied to at least one voltage level to provide the stepping revision level of the second hardware component; and
selection logic accessible by the second processor to enable the selection of a value from either the stepping revision ID register or one of the one or more compatible revision ID registers and to make the value readable from the revision ID register by the first processor, wherein the selection logic comprises a multiplexer within an integrated circuit and the stepping revision ID register comprises at least one hardwired connection within the integrated circuit that ties at least one input of the multiplexer to at least one voltage level to provide the value indicating the actual stepping revision level of the first hardware component.

13. The computer system of claim 12, wherein the selection logic is controlled by the second processor executing instructions of the initialization software.

14. The computer system of claim 12, wherein the address at which the revision ID register is readable by the processor conforms with the address location for the revision ID register specified for use with a peripheral component interconnect (PCI) bus.

15. The computer system of claim 12, wherein the first hardware component is incorporated within the first processor.

* * * * *